Dec. 5, 1950
H. A. HOWELL
2,532,917
DUAL CHANNEL MAGNETIC RECORDER AND METHOD
Filed Oct. 18, 1946
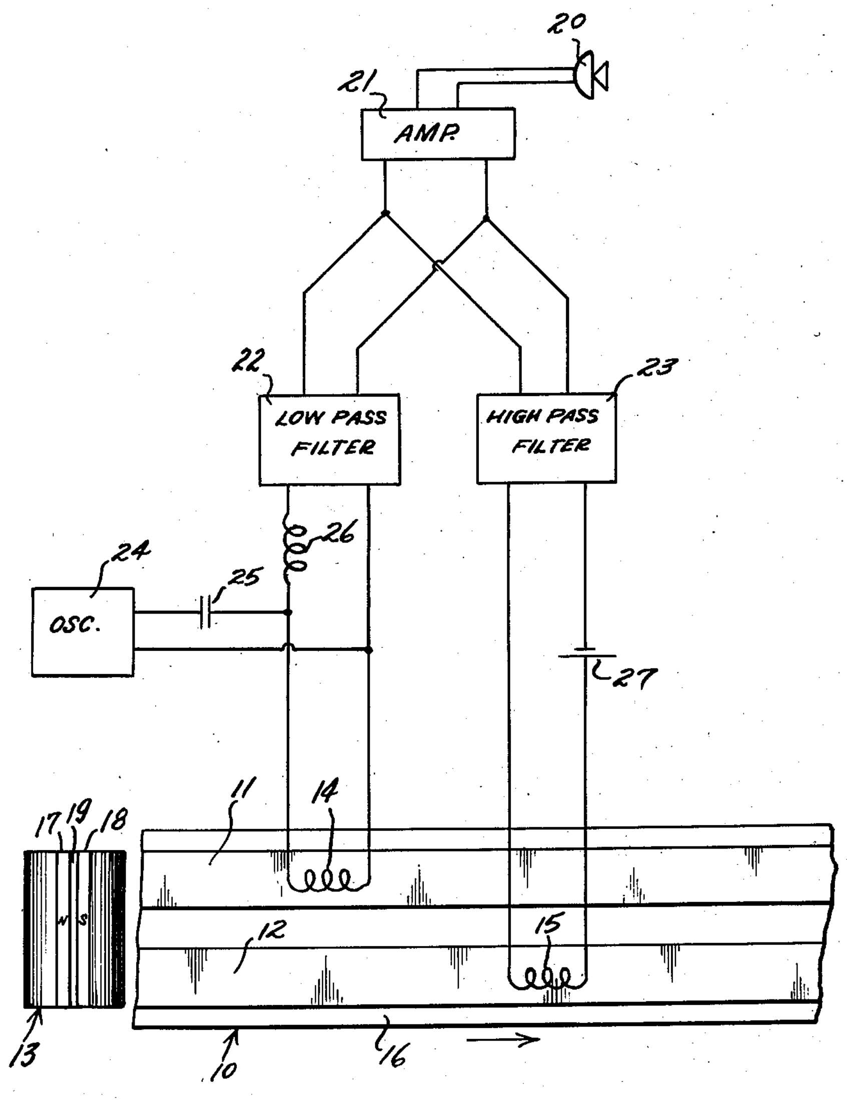
Inventor
HUGH A. HOWELL
by The Firm of Charles W. Hills Attys.

Patented Dec. 5, 1950 2,532,917

UNITED STATES PATENT OFFICE 2,532,917

DUAL CHANNEL MAGNETIC RECORDER AND METHOD

Hugh A. Howell, Valparaiso, Ind., assignor to The Indiana Steel Products Company, Chicago, Ill., a corporation of Indiana Application October 18, 1946, Serial No. 704,036

6 Claims. (Cl. 179—100.2)

This invention relates to a dual channel magnetic recorder and method, and more particularly, to a novel method and means for magnetic recording in which the normal audio range is separated into two bands for independent, simultaneous recordings on dual tracks, but in which the low band is recorded with a superimposed high frequency bias and in which the high range is recorded with a D. C. bias.

It has been determined that the relatively low notes of the audio range are much better recorded in any magnetic recording process when a high frequency bias is employed. When the term "high frequency bias" is employed, it is meant that an additional high frequency signal is superimposed on the low frequency signal to be recorded, the frequency of the high frequency signal being sufficiently great that under normal conditions it will not be recorded on the magnetizable record member.

It has further been determined that high notes are recorded with greater degree of fidelity and less background noise when the magnetically polarized, and preferably saturated, record member is passed through a field excited by the audio signal and a superimposed direct current bias, the direction of the direct current bias being such as to cause partial demagnetization of the saturated record member.

One of the principal features and objects of the present invention is to provide a novel method and means for magnetic recording in which a single tape having a pair of magnetizable tracks thereon is first passed through a strong D. C. biasing field which substantially saturates the magnetizable tracks on the tape, and in which the tracks are thereafter passed through a pair of fluctuating magnetic fields, respectively, one of which is excited by the audio signals below a predetermined point in the audio range with a superimposed high frequency signal, the other of which is excited by the audio signals above said predetermined point and biased by a unidirectional magnetizing field component opposite to that of the saturating field.

A further object of the present invention is to provide a novel dual channel magnetic recording device and method.

Another object of the present invention is to provide a novel method of feeding energy to the recording means of a magnetic recorder.

A still further object of the present invention is to separate the signal into an upper band and a lower band and to bias the upper band by direct current and the lower band by high frequency current during the recording process.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawing, in which the single figure thereof is a diagrammatic illustration of a dual channel magnetic recorder embodying the novel teachings and characteristics of the present invention.

As shown in the single figure of the drawing, a tape 10 having a pair of magnetizable channel portions 11 and 12 is arranged to pass over the permanent magnet 13 before it passes the recording heads 14 and 15 which are associated with the tracks 11 and 12, respectively. The magnetic record member 10, may, of course, vary widely without departing from the spirit and scope of the present invention. By way of example and not by way of limitation, the magnetic record member 10 may be in the form of a paper tape 16 having two bands of magnetizable material secured thereon to form two magnetizable channels 11 and 12.

These channels 11 and 12 may be formed of suitable powdered magnetizable material having relatively high coercive force and cemented to the tape 16 by any suitable binder.

The saturating magnet 13 sometimes called an "erase" magnet is arranged with two confronting pole portions 17 and 18 with a gap 19 lying therebetween. The gap 19 extends transverse to the direction of travel of the magnetic record member 10. It will be noted that the permanent magnet 13 is sufficiently wide so as to extend across both channels or tracks 11 and 12.

It is also to be understood that the permanent magnet 13 is sufficiently strong so as to either substantially saturate the tracks 11 and 12 in a longitudinal direction, or at least to raise them to a uniform magnetic potential level which is at least as high as the highest previously recorded signal.

The input circuit representing the means for picking up the signal to be recorded is diagrammatically represented as a microphone 20. The microphone is connected to the input side of a suitable audio amplifier 21. The output of the audio amplifier is connected to a low pass filter represented by the block diagram 22 and also in parallel to a high pass filter represented by the block diagram 23. It is to be understood that the two filters 22 and 23 are arranged to separate the signal picked up by the microphone 20 into two frequency bands, a low band and a high band. For example, the two filters may be so arranged that the filter 22 passes only signals below 1,000 cycles per second, while the filter 23 passes only signals above 1,000 cycles per second. While this point of separation as between the low band and the high band may vary to a considerable extent without departing from the spirit and scope of my invention, it has been found from a practical standpoint exceptionally good results may be obtained by making this point somewhere between 800 and 1,000 cycles.

The output side of the low pass filter 22 is connected to the head 14, while the output of the high pass filter 23 is connected to the recording head 15.

As previously indicated, the low frequency band is to be recorded with the use of a high frequency bias. This is obtained by taking the output of a suitable high frequency oscillator 24 and connecting it through a condenser 25 to the head circuit of the head 14. The condenser 25 prevents the low frequency signals from being fed back into the oscillator 24.

In order to keep the high frequency bias out of the filter 22 and the amplifier 21, a choke coil 26 is preferably employed in the circuit between the oscillator connection and the low pass filter 22.

The higher band of audio signal which is fed to the recording head 15 receives a D. C. bias by means of a bias battery 27 connected in the head circuit of the head 15. It will be understood that the bias battery 27 is connected into the circuit in such a manner that its D. C. component sets up a magnetic field component tending to partially demagnetize the track 12. In other words, this magnetic field component established by the bias battery 27 is in a direction opposite to that of the polarizing field created by the permanent magnet 13. While a battery 27 is shown as providing this partial demagnetizing magnetic field component, it will, of course, be understood that this component may be provided by any suitable electric or magnetic means without departing from the spirit and scope of the present invention.

Insofar as the frequency of the oscillator 24 is concerned, this is preferably relatively high, for it has been found that the higher the high frequency bias field is in any head, the purer the low frequency response is and the higher the energy level is which may be recorded without distortion.

Where, as in the past, the high frequency bias field has been employed with only a single recording head, it has been noted that by increasing the high frequency bias, you progressively lessen the high frequency response. It will, therefore, be apparent that by eliminating the use for the high frequency bias for the higher frequencies, the beneficial effect of a real high high frequency bias may be employed in order to greatly improve the quality of the low frequency response. The high frequency response is made relatively pure and efficient in the present novel recorder and method by employing a D. C. bias.

It will, of course, be apparent that a relatively low frequency bias may be employed for the higher signal band rather than a D. C. bias in conjunction with a relatively high high frequency bias for the lower signal band.

While I have shown a certain, particular embodiment of my invention, it will, of course, be understood that I do not wish to be limited thereto, and I therefore, contemplate by the appended claims to cover all such modifications as fall within the true spirit and scope of my invention.

I claim as my invention:

1. A magnetic recorder comprising a dual magnetizable track record member, a polarizing head for substantially magnetically saturating said tracks, a pair of recording heads, one associated with each track, a signal input ciriuit, filter means for separating an input signal into a lower band and an upper band, means for feeding said lower band to one of said heads and said upper band to the other of said heads, means for superimposing a high frequency signal on said lower band as it is fed to its associated head, and means for superimposing a D. C. bias on said upper band as it is fed to its associated head.

2. A magnetic recorder comprising a dual magnetizable track recorder member, a polarizing head for substantially magnetically saturating said tracks, a pair of recording heads, one associated with each track, a signal input circuit. filter means for separating an input signal into a lower band and an upper band, means for feeding said lower band to one of said heads and said upper band to the other of said heads, means for superimposing a high frequency signal on said lower band as it is fed to its associated head, and means for superimposing a D. C. bias on said upper band as it is fed to its associated head, the D. C. biasing component being such as to tend to establish a magnetic field opposite to that of said saturating magnet.

3. A magnetic recorder comprising a dual magnetizable track record member, polarizing means substantially saturating said tracks in a direction longitudinally of said record member, a pair of recording heads for establishing fluctuating magnetic fields whose respective magnetic axes lie parallel to the longitudinal axis of said record member, one of said heads being associated with one of said tracks and the other of said heads being associated with the other of said tracks, a signal input circuit, a low pass filter and a high pass filter connected in parallel to the output of said signal input circuit, said low pass filter being connected to one of said recording heads and said high pass filter being connected to the other of said recording heads, a high frequency oscillator connected to said recording head associated with said low pass filter, and a D. C. bias battery connected in the head circuit of said high pass filter, the direction of the D. C. biasing force being such as to tend to create a magnetic field to partially demagnetize the track associated with the head connected to the high pass filter.

4. The method of magnetic recording which includes separating the signal to be recorded into a lower band and an upper band and then simultaneously subjecting a first magnetizable record member to said lower band and a superimposed high frequency bias current and a second magnetizable record member to said upper band and a superimposed direct current bias.

5. The method of magnetic recording on a dual track magnetic record member which includes the steps of first magnetically saturating said tracks and then subjecting one of said tracks to a high frequency magnetic field and a predetermined low frequency portion of the signal to be recorded and the other track to the remaining portion of said signal and a uni-directional magnetic field.

6. The method of magnetic recording which includes separating the signal to be recorded into two bands, creating a fluctuating magnetic field with each band, and then recording with the magnetic field of the low band with a high frequency magnetic field superimposed thereon, and simultaneously recording with the magnetic field of the upper band with a uni-directional magnetic field superimposed thereon.

HUGH A. HOWELL.

REFERENCES CITED

The following references are of record in the file of this patent:

UNITED STATES PATENTS

| Number | Name | Date |
| --- | --- | --- |
| 873,083 | Poulsen | Dec. 10, 1907 |
| 1,640,881 | Carlson | Aug. 30, 1927 |
| 2,272,821 | Roys | Feb. 10, 1942 |
| 2,279,018 | Wolfe | Apr. 7, 1942 |
| 2,213,246 | Heller | Sept. 3, 1948 |
| 2,493,742 | Begun | Jan. 10, 1950 |

OTHER REFERENCES

"An Appraisal of Design Trends in Magnetic Sound Recorders," Electrical Manufacturing, June 1946. (Copy in Div. 16.)